J. BURNS.

Processes of Cooling Coffee.

No. 6,144. Reissued Nov. 24, 1874.

WITNESSES
Nat. E. Oliphant
Harry C. Birch.

INVENTOR
Jabez Burns.
Chas. H. Fowler.
Attorney

UNITED STATES PATENT OFFICE.

JABEZ BURNS, OF NEW YORK, N. Y.

IMPROVEMENT IN PROCESSES OF COOLING COFFEE.

Specification forming part of Letters Patent No. 61,393, dated January 22, 1867; reissue No. 5,658, dated November 18, 1873; reissue No. 6,144, dated November 24, 1874; application filed November 11, 1874.

*To all whom it may concern:*

Be it known that I, JABEZ BURNS, of the city and county and State of New York, have invented an Improvement in the Process of Cooling Coffee or substitutes for coffee; and I do hereby declare the following to be a full, clear, and exact description of the same, reference being had to the accompanying drawing forming a part of this specification, in which drawing—

Figure 1:
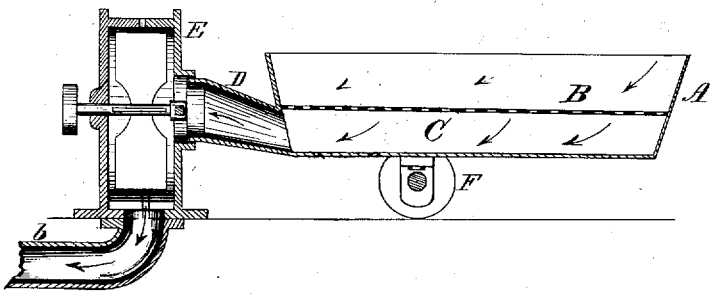
Figure 2:
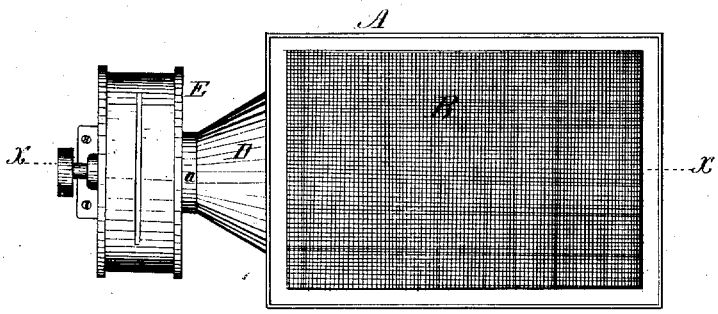

Figure 1 illustrates a longitudinal vertical section of the means which I believe is best adapted in successfully carrying out my said invention, the line *x x*, Fig. 2, indicating the plane of section; Fig. 2, a plan or top view of the same.

Similar letters of reference indicate corresponding parts.

Previous to my invention cooling coffee or its substitutes was accomplished by putting the same in a wire cylinder and allowing the cylinder to revolve, and a more recent method was to force, by means of a fan-blower, a blast of air up through the coffee or substitutes for coffee. The former method of cooling by a revolving wire cylinder requires as much power to cool as it does in the process of roasting, besides being very slow and expensive. The last-named method of cooling by forcing a blast of air up through the coffee is attended with many objections, as the heat, dust, and smoke are forced into the room where the operation takes place, making it almost unbearable in warm weather; besides, the dust or light chaff is spread over the entire place out of the reach of being cleaned, and should a fire occur from any cause the light chaff would be the means of spreading the flames; and, again, unless the blast was sufficient and properly directed, one portion of the coffee would cool much quicker than the other, and the coffee in the corners of the box would often spoil.

To overcome these difficulties is the aim and purpose of my invention; and it therefore consists in creating a downward draft through the coffee or substitutes for coffee to be cooled by aid of a suction-blower or other suitable apparatus in such a manner that the heat, dust, and smoke contained in and arising from the coffee or substitutes for coffee, after coming from the roasting-cylinder, are drawn downward and off during the process of cooling, thus entirely freeing the room from the heat, dust, and smoke, and preventing the injurious effects that they would otherwise have upon the health of the persons employed in the operation.

In the accompanying drawing, A represents a broad flat-bottomed pan or vat made of sheet-metal or any other suitable material, and provided with a perforated false bottom, B, which is placed in the pan at some distance above its real bottom C. From the side of the pan, between the two bottoms B C, proceeds a tube, D, whose outer end is secured in the central aperture *a* of a suction-blower, E. The blower in the present instance is secured to the floor at a suitable height to receive the tube D, and allow connection to be made or established between the pan and blower. The pan A may be placed on wheels F, so that it can be readily brought to the proper position to be connected with the blower, and in such case one pan can be readily removed and replaced by another whenever it may be desirable or convenient. From the bottom of the blower E proceeds a discharge-pipe, *b*, which, in the drawing shown, is conducted down through the floor of the room out of the way of the operatives, and may, if desired, be led to the ash-pan of the furnace of the establishment, or to any place where smoke and dust will not produce any inconvenience.

In carrying out my invention the coffee or other material, directly after coming from the roasting-cylinder, is poured into the pan A on the perforated bottom, so as to form a stratum of suitable thickness, and, connection between the pan and blower made, the latter is put in motion. A downward current of air is thus caused to pass through the coffee, or substitute for coffee, to be cooled, and the heat, dust, and smoke generally arising from the articles to be cooled, after going through the process of roasting, are entirely drawn down into the space between the bottoms B and C and into the blower, whence they are discharged through the pipe *b*.

By the employment of a downward current of air in cooling, the smoke and dust are drawn down through the coffee or other such substance, and prevented from rising in the room or apartment in which the operation is carried on, and discharged elsewhere; and, if desired, said smoke and dust can be utilized by injecting them into the furnace, where they may be used to feed the fire.

I am aware that it is not new to force or draw air down through grain in bulk for the purpose of keeping the grain cool and dry, and preventing the same from spoiling. I am also aware that it is common to extract the moisture from and to dry fibrous substances by inclosing the same in a suitable receptacle and causing air to pass down through it by aid of air-pumps or other equivalent means; but Having fully described in my specification and shown in my drawing one means of carrying out my invention, what I do claim as new, and desire to secure by Letters Patent, is—

The process of cooling coffee or substitutes for coffee, and, at the same time, removing the dust and smoke therefrom by means of a downward current of air, substantially as described.

In testimony that I claim the foregoing as my own invention I affix my signature in presence of two witnesses.

JABEZ BURNS.

Witnesses:
WM. G. BURNS,
WILLIAM LAWLOR.